United States Patent
El-Sayed et al.

(10) Patent No.: US 8,007,606 B2
(45) Date of Patent: Aug. 30, 2011

(54) SALVAGE PROCESS FOR SPRING ELEMENTS

(75) Inventors: Sami El-Sayed, Peoria, IL (US); Howard D. Jenkel, Laredo, TX (US); Paul May, Indianapolis, IN (US)

(73) Assignee: Caterpillar Inc., Peoria, IL (US)

( * ) Notice: Subject to any disclaimer, the term of this patent is extended or adjusted under 35 U.S.C. 154(b) by 467 days.

(21) Appl. No.: 12/146,050

(22) Filed: Jun. 25, 2008

(65) Prior Publication Data
US 2009/0320970 A1 Dec. 31, 2009

(51) Int. Cl.
C21D 9/02 (2006.01)
(52) U.S. Cl. ............... 148/580; 148/908; 29/402.01; 29/402.21; 29/896.93
(58) Field of Classification Search .......... 148/580, 148/908; 29/896.8, 896.93, 402.01, 402.21, 29/90.7, 402, 21; 72/53
See application file for complete search history.

(56) References Cited

U.S. PATENT DOCUMENTS

| | | |
|---|---|---|
| 894,428 A | 7/1908 | Emery |
| 2,261,878 A | 11/1941 | Hathaway |
| 2,666,723 A | 1/1954 | Stewart |
| 2,745,658 A | 5/1956 | Gaskins |
| 2,995,648 A * | 8/1961 | Heal .............. 219/153 |
| 3,002,865 A * | 10/1961 | Johnson ......... 148/580 |
| 3,311,733 A | 3/1967 | Bitzer, Jr. |
| 3,589,950 A | 6/1971 | Justusson |
| 4,186,039 A | 1/1980 | Bache et al. |
| 4,245,819 A | 1/1981 | Bache et al. |
| 6,101,718 A | 8/2000 | Zysman |
| 6,779,564 B2 | 8/2004 | Hasegawa et al. |
| 6,811,149 B1 * | 11/2004 | Johnson ......... 267/167 |

FOREIGN PATENT DOCUMENTS
SU 1468935 * 3/1989

OTHER PUBLICATIONS

Metalworking:Sheet Forming, vol. 14B, ASM Handbook, ASM International, 2006, p. 861-862, http://products.asminternational.org.*

* cited by examiner

*Primary Examiner* — Deborah Yee
(74) *Attorney, Agent, or Firm* — Leydig, Voit & Mayer

(57) ABSTRACT

An improved method for salvaging a spring element with a degraded force constant for return to a work environment. The spring element is subjected to a high temperature and extended duration annealing treatment alone or in combination with other treatments. The resultant salvaged spring is characterized by a more durable force constant relative to the original spring when it was new.

17 Claims, 3 Drawing Sheets

SALVAGE PROCESS FOR SPRING ELEMENTS

TECHNICAL FIELD

This patent disclosure relates generally to springs subjected to multiple load and recovery cycles and, more particularly, to a process for salvaging such springs following prolonged use in a work environment with substantial recovery of diminished force constant levels.

BACKGROUND

It is generally known to use springs as biasing elements. In many devices, springs undergo multiple load and recovery cycles over a useful life. During an individual cycle the spring is generally compressed by application of a displacement force. This displacement force may be a compressive force or a tensioning force. As the displacement force is applied, the spring acts to counter the displacement force by biasing back towards the original position.

In general, during each individual cycle a spring substantially acts according to Hook's law of elasticity which requires that the distance of the extension or compression is proportional to the restoring force exerted by the spring. This is represented by the following formula:

$$F = -KX$$

where "X" is the distance that the spring has been stretched or compressed away from its equilibrium position, "F" is the restoring force exerted by the spring and "K" is the force constant (also known as the spring constant) of the spring which normally has units of force per unit length. The negative sign reflects that the restoring force is in opposition to the direction of displacement. The potential energy stored by the extended or compressed spring is given by the formula:

$$U = \tfrac{1}{2} K X^2$$

which is the integral of force over distance.

Over an extended life of multiple load and recovery cycles the force constant may tend to gradually degrade over time due to deformation and/or crystalline structural changes within the material forming the spring. As will be appreciated from the above formulas, such degradation in the force constant likewise causes a reduction in the restorative force and potential energy provided by the spring. When these levels become too low, the spring is no longer functional for its purpose of counterbalancing a displacement force and the spring must be replaced. In the past, springs with degraded force constants were often discarded and replaced with new springs. However, due to the cost and effort associated with manufacturing an original precision spring, this practice may be undesirable.

U.S. Pat. No. 6,101,718 to Zysman issued Aug. 15, 2007, discloses a method for producing a mattress with improved load bearing capacity. The method disclosed in U.S. Pat. No. 6,101,718 uses a stripped inner spring assembly which is repaired and heat treated to provide stress relief to components with little or no prior heat treating history. The inner spring assembly is then recovered with padding and ticking. The resultant mattress has an overall improved load bearing capacity relative to the original mattress when it was new.

In the mattress construction disclosed in U.S. Pat. No. 6,101,718 the spring elements are subjected to a stress relief treatment for a relatively brief time of about ten to twenty minutes at a relatively low temperature of about 550 degrees Fahrenheit. Such a treatment is intended to relieve stresses in components which had little if any stress relief at the time of original assembly. U.S. Pat. No. 6,101,718 notes that if temperatures are too high the wire forming the spring elements may undergo degradation.

While a system such as disclosed in U.S. Pat. No. 6,101,718 may provide certain stress relief benefits to elements which have not previously been subjected to heat treatment, the advocated low temperatures and short durations of the treatment may not be adequate to provide significant structural long term recovery to elements subject to degradation. Accordingly, an improved system for the salvage of springs suitable to provide long-term benefits to materials with a substantial prior heat treatment history is desirable.

SUMMARY

In accordance with one aspect, the present disclosure provides a method for recycling a spring adapted for multiple load and recovery cycles during extended use. The method includes providing a spring characterized by a force constant at a first level. The spring is used in a first work environment where it is subjected to a first number of load and recovery cycles such that the force constant is reduced to a second level. This reduction takes place at a first average rate of degradation per cycle. The spring is recovered from the first work environment and annealed. The annealing elevates the diminished force constant from the second level to a third level between the first level and the second level. The spring is then placed in a second work environment and subjected to a second number of load and recovery cycles. The first work environment and the second work environment may be the same or different. During the second number of load and recovery cycles the force constant is reduced at a second average rate of degradation per cycle. The second average rate of degradation per cycle is lower than the first average rate of degradation per cycle.

DETAILED DESCRIPTION

This disclosure relates to an improved method for salvaging spring elements with degraded force constants for return to a work environment. The spring element is subjected to a high temperature and extended duration annealing treatment alone or in combination with a shoot peening treatment. The resultant spring structure is thereafter characterized by a slightly lower but more durable force constant relative to the original spring when it was new.

Figure 1:
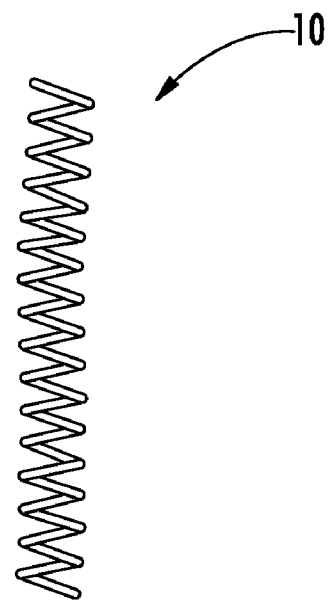
FIG. 1 is a schematic view illustrating an exemplary spring element in an unbiased state.

Reference will now be made to the drawings wherein, to the extent possible, like elements are designated by like reference numerals throughout the various views. FIG. 1 illustrates an exemplary spring element 10 having an arrangement of coils arranged in a generally helical configuration. As will be appreciated, the spring element 10 is adapted to undergo extension upon the application of a tensioning force and compaction upon application of a compressive force. When the spring element 10 is extended or compressed, the spring element 10 generates a reactive restoring force as it seeks to return to a neutral state.

Figure 2:
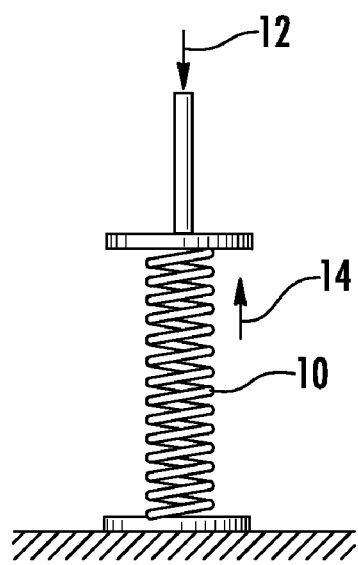
FIG. 2 is a schematic view illustrating the exemplary spring element of FIG. 1 in a biasing partially compressed state.

By way of example only, and not limitation, FIG. 2 illustrates the exemplary spring element 10 in a state of compression wherein a loading force 12 compresses the spring element 10 thereby resulting in a restoring force 14 being produced by the spring element 10. When the loading force 12 and the restoring force 14 are equivalent, the spring element 10 is held in a static compressed state. If the loading force 12 is reduced or eliminated, the restoring force 14 acts to return the spring element 10 to a force-neutral position. Thus, by applying and subsequently reducing or removing the loading force 12, the spring element 10 undergoes a cycle of load and recovery. The same phenomenon is present if the spring element 10 is subjected to a loading force in the form of tension which stretches the spring and which is thereafter reduced or eliminated.

Due to the propensity of the spring element 10 to naturally recover from a compressed or extended loaded condition back towards a neutral state, it is useful to utilize such a spring element 10 in a number of applications where a biasing force is required for system recovery following reduction or removal of an applied loading force. By way of example only, and not limitation, such applications may include valves, fuel injectors, and other mechanical structures where precision opening and closing is required. In such uses the spring element 10 may be positioned to normally bias a closing element to a predefined position defining either an open or closed condition. A loading force may be provided to overcome the biasing action of the spring element 10 thereby changing the condition from open to closed or from closed to open. Upon reduction or removal of the loading force, the biasing action of the spring element 10 causes a return to the normal condition.

The spring element 10 is typically formed from a resilient structural material suitable for both plastic and elastic deformation so as to permit initial fabrication and subsequent use. Exemplary materials of construction may include metals which may be worked to form a desired configuration and thereafter provide long-term resiliency during multiple loading and recovery cycles. Spring steels and other ferrous alloys may be particularly useful for many applications. Of course, non-ferrous alloys may also be utilized if desired.

Regardless of the alloy system used in the formation of the spring element 10, the spring element 10 may undergo an initial high temperature process annealing treatment to substantially relieve internal stresses imparted during the fabrication process. Such a pre-use annealing procedure may provide an enhanced resistance to premature failure caused by dislocations or other stress risers within the spring element 10 as initially fabricated. By way of example only, such pre-use annealing may be carried out at a temperature of about 500° Fahrenheit to about 590° Fahrenheit for a period of about 24 hours to about 48 hours. However, other temperature ranges and/or durations may likewise be utilized if desired.

Once the spring element 10 which has undergone a pre-use treatment is put into service, it may be subjected to a large number of loading and recovery cycles. These loading and recovery cycles may also be accompanied by substantial temperature variations during use. Over a prolonged period of use, the force constant of the spring element 10 tends to degrade at a gradual rate as the material forming the spring element 10 undergoes fatigue and strain hardening. This degradation in the force constant causes a reduction in the restoring force 14 generated by the spring element 10. The degradation in the force constant may be tracked relative to the number of load and recovery cycles experienced by the spring element 10 after being put in service. The degradation rate may thereafter be averaged on a per cycle basis during the period of use.

When the force constant of the spring element 10 has degraded beyond an acceptable level, the spring element 10 may no longer be suitable for continued use. Historically, such used spring elements were subjected to recycling through melting and recovery of their alloy contents. However, the present disclosure contemplates the ability to recondition the spring element 10 following initial use and degradation of the force constant while concurrently improving resistance to future degradation of the force constant during a second life-cycle phase.

Figure 3:
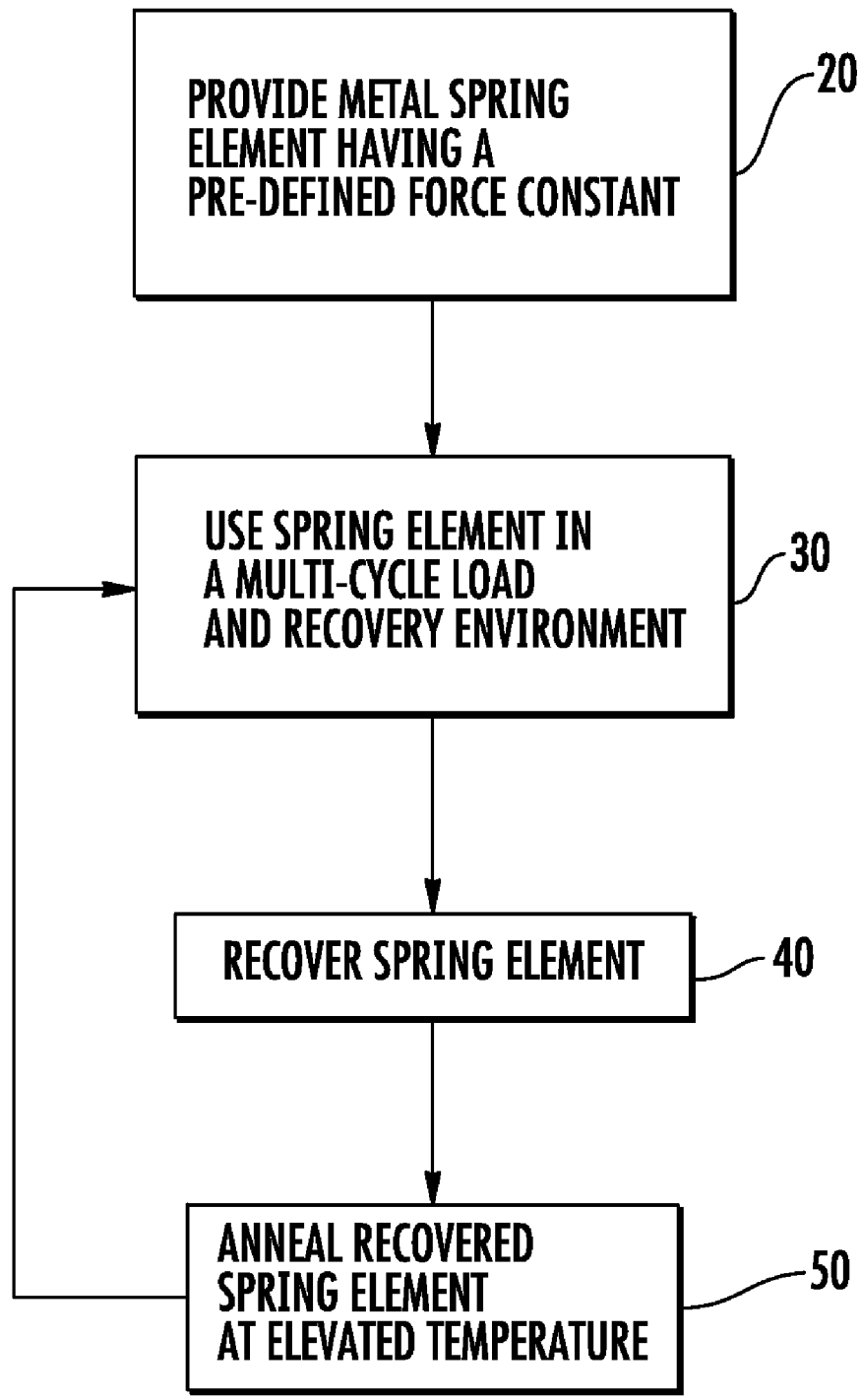
FIG. 3 is a flow chart setting forth steps in an exemplary process for salvaging a spring element from a work environment.

By way of example only, and not limitation, a first exemplary recycling procedure for a spring element 10 is set forth in the flow chart of FIG. 3. As illustrated, the recycling procedure utilizes an initial providing step 20 during which a fabricated and annealed spring element 10 is provided having a pre-defined force constant. The spring element 10 is thereafter subjected to a use step 30 during which the spring element 10 is subjected to a multi-cycle load and recovery environment. During such multi-cycle use, the initial force constant of the spring element 10 is gradually degraded over time. This degradation may be measured and quantified on a per-cycle basis to provide a first average rate of degradation per cycle.

As shown in the flow chart of FIG. 3, following initial use, the spring element 10 may be subjected to a recovery step 40. During this recovery step 40 the spring element may be cleaned by solvents, scouring agents, ultrasonic cleaners or the like to remove any adhered debris which may have been collected during use. Of course, other recovery treatments may likewise be utilized as may be desired.

Following the recovery step 40, the spring element 10 is thereafter subjected to a high temperature and prolonged duration annealing step 50. By way of example only, the annealing step 50 may be carried out in either a natural or a controlled atmosphere at a temperature of about 500° Fahrenheit to about 800° Fahrenheit for a period of about 8-12 hours. Of course, it is contemplated that the temperature and/or duration of the annealing treatment may be adjusted as desired. In this regard, it is contemplated that a temperature of at least about 700° Fahrenheit for a period of at least 8 hours may be particularly beneficial. An annealing treatment at a temperature of about 750° Fahrenheit for a period of about 10-12 hours may be particularly beneficial for ferrous alloy compositions.

Figure 4:
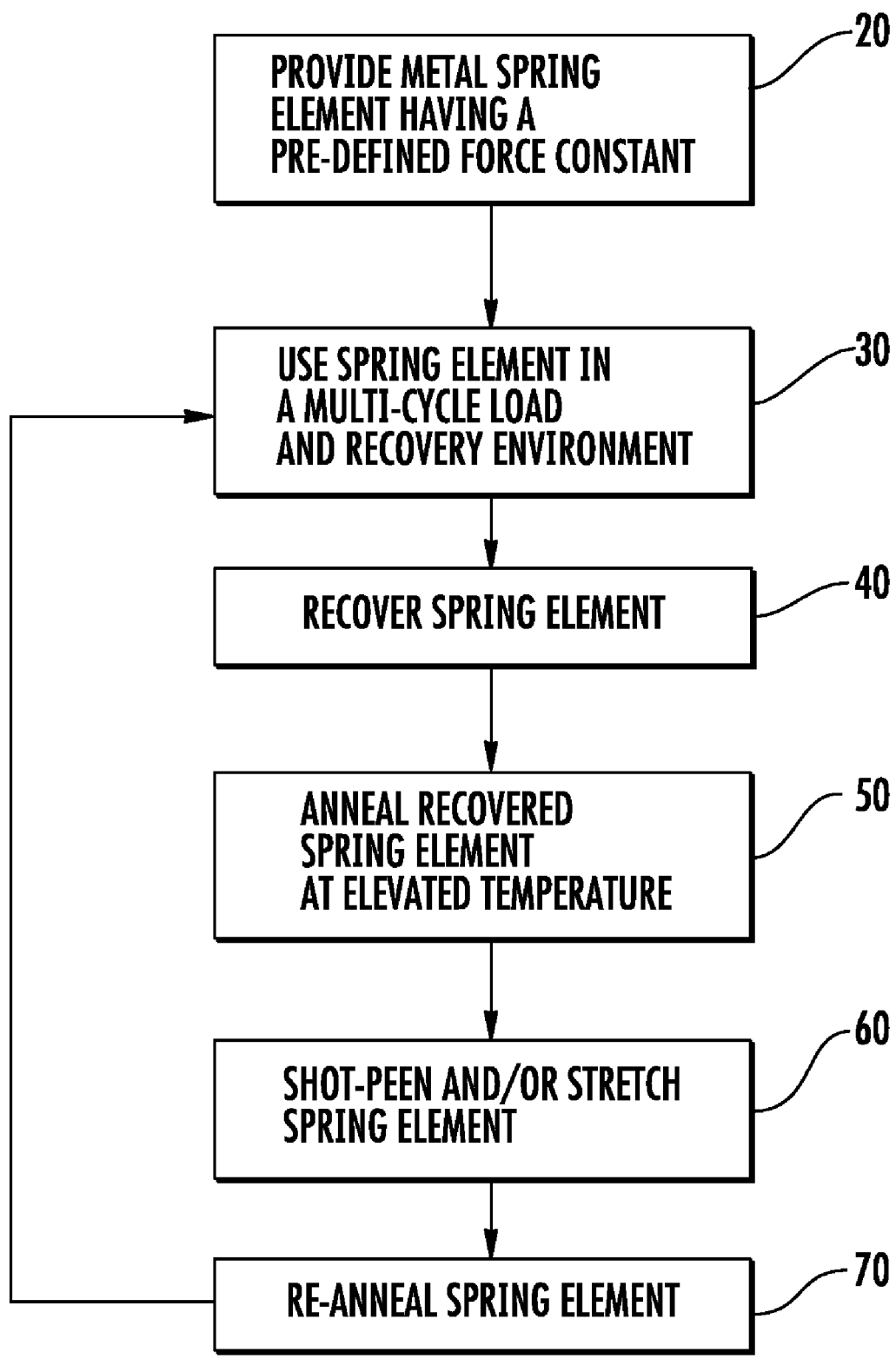
FIG. 4 is a flow chart setting forth steps in another exemplary process for salvaging a spring element from a work environment.

Following the annealing step 50, the spring element 10 may thereafter be returned for use in a multi-cycle load and recovery environment. Alternatively, the spring element 10 may be subjected to additional treatments as may be desired. According to one exemplary practice set forth in the flowchart of FIG. 4, following the annealing step 50, the spring element 10 may be subjected to a strengthening step 60 such as shot peening and/or stretching followed by a re-annealing step 70 prior to being returned to the multi-cycle load and recovery environment.

It has been found that the annealing step 50 either with or without shot-peening or stretching procedures results in a substantial recovery of the degraded force constant within the spring element 10. By way of example only, and not limitation, it has been found that in springs where the force constant has been degraded by about 6% during multi-cycle use, the ultimate degradation is less than 1% after the annealing treatment. That is, the force constant of the recovered and annealed spring element is within 1% of the force constant the spring element 10 had when new. This level of force constant recovery makes the annealed spring element suitable for return to a multi-cycle load and recovery environment.

Surprisingly, it has also been found that following return to a multi-cycle load and recovery environment the recovered and annealed spring element is characterized by an improved resistance to force constant degradation relative to the spring element when new. By way of example only, it has been found that when the spring element 10 is new, and is subjected to cyclical load and recovery testing for a period of 500 hours, the loss in the force constant level averaged about 4%. Conversely, salvaged springs subjected to recovery and annealing showed a force constant degradation of only about 3% following 500 hours of cyclical load and recovery testing. Thus, the annealing treatment results in a nearly complete recovery in the force constant level and an improvement in resistance to force constant degradation upon return to a use environment.

INDUSTRIAL APPLICABILITY

The industrial applicability of the salvage process for spring elements described herein will be readily appreciated from the foregoing discussion. A salvage process consistent with the present disclosure may be used to recondition precision spring elements to a state suitable for return to rigorous multi-cycle use environments. By way of example only and not limitation, such salvaged and reconditioned springs may be used in valves, fuel injectors and other devices characterized by a high number of use cycles and which require consistent spring action over long periods of time.

In practice, a salvage process for spring elements described herein may be used in conjunction with repair and refurbishment of industrial equipment, transportation vehicles and the like where precision springs are utilized. In such environments, resistance to degradation in spring force constant levels may promote the longevity of operation. Moreover, the need to fabricate new springs may be reduced or eliminated.

It will be appreciated that the foregoing description provides examples of the disclosed system and technique. However, it is contemplated that other implementations of the disclosure may differ in detail from the foregoing examples. All references to examples herein are intended to reference the particular example being discussed at that point and are not intended to imply any limitation as to the scope of the disclosure or claims more generally. All language of distinction and disparagement with respect to certain features is intended to indicate a lack of preference for those features, but not to exclude such from the scope of the claims entirely unless otherwise indicated.

Accordingly, this disclosure contemplates the inclusion of all modifications and equivalents of the subject matter recited in the appended claims as permitted by applicable law. Moreover, any combination of the above-described elements in all possible variations thereof is contemplated unless otherwise indicated herein or otherwise clearly contradicted by context.

What is claimed is:

1. A method for recycling a spring element adapted for multiple load and recovery cycles during extended use, the spring element being characterized by a force constant at a first level when produced and having been subjected to a first number of load and recovery cycles in a first work environment such that the force constant has been reduced to a second level at a first average rate of degradation per cycle and thereafter recovered from said first work environment, the method comprising the steps of:

(a) annealing said spring element at a level of about 500 to about 800 degrees Fahrenheit for about 8 to 12 hours such that said force constant is elevated from said second level to a third level between said first level and said second level;
   (b) placing said spring element in a second work environment; and
   (c) subjecting said spring element to a second number of load and recovery cycles such that said force constant is reduced at a second average rate of degradation per cycle, the second average rate of degradation per cycle being lower than the first average rate of degradation per cycle.

2. The method as recited in claim 1, wherein said spring element is formed from a ferrous alloy.

3. The method as recited in claim 1, wherein the first work environment is the same as the second work environment.

4. The method as recited in claim 1, wherein said spring element is formed from a ferrous alloy and wherein the annealing step is carried out at a level of about 700 to about 800 degrees Fahrenheit for not less than about 10 hours.

5. The method as recited in claim 4, wherein said spring element is formed from a ferrous alloy and wherein the annealing step is carried out at a level of about 750 to about 800 degrees Fahrenheit for about 10 to 12 hours.

6. The method as recited in claim 4, wherein said third level of said force constant is not more than about 1 percent below said first level of said force constant.

7. The method as recited in claim 1, wherein said third level of said force constant is not more than about 1 percent below said first level of said force constant.

8. The method as recited in claim 1, comprising the further steps of shot-peening and re-annealing said spring element following the annealing step (a).

9. A method for recycling a spring element adapted for multiple load and recovery cycles during extended use, the method comprising the steps of:

(a) providing a spring element characterized by a force constant at a first level;
   (b) subjecting said spring element to first number of load and recovery cycles in a first work environment such that said force constant is reduced to a second level at a first average rate of degradation per cycle;
   (c) recovering said spring element from said work environment;
   (d) annealing said spring element at a level of about 500 to about 800 degrees Fahrenheit for about 8 to 12 hours such that said force constant is elevated from said second level to a third level between said first level and said second level;
   (e) placing said spring element in a second work environment; and
   (f) subjecting said spring element to a second number of load and recovery cycles such that said force constant is reduced at a second average rate of degradation per cycle, the second average rate of degradation per cycle being lower than the first average rate of degradation per cycle.

10. The method as recited in claim 9, wherein said spring element is formed from a ferrous alloy.

11. The method as recited in claim 9, wherein the first work environment is the same as the second work environment.

12. The method as recited in claim 9, wherein said spring element is formed from a ferrous alloy and wherein the annealing step is carried out at a level of about 700 to about 800 degrees Fahrenheit for not less than about 10 hours.

13. The method as recited in claim 12, wherein said spring element is formed from a ferrous alloy and wherein the annealing step is carried out at a level of about 750 to about 800 degrees Fahrenheit for about 10 to 12 hours.

14. The method as recited in claim 12, wherein said third level of said force constant is not more than about 1 percent below said first level of said force constant.

15. The method as recited in claim 9, wherein said third level of said force constant is not more than about 1 percent below said first level of said force constant.

16. The method as recited in claim 9, comprising the further steps of shot-peening and re-annealing said spring element following the annealing step (d).

17. The method as recited in claim 9, comprising the further steps of stretching and re-annealing said spring element following the annealing step (d).

* * * * *